(12) United States Patent
McBride et al.

(10) Patent No.: US 8,077,011 B2
(45) Date of Patent: *Dec. 13, 2011

(54) APPARATUS FOR AUTOMATICALLY INITIATING SEQUENCE OF VEHICLE FUNCTIONS

(75) Inventors: Justin P. McBride, West Bloomfield, MI (US); Thomas J. Keeling, Plymouth, MI (US); Michael A. Wiegand, Birmingham, MI (US); Christopher M. Kurpinski, Berkley, MI (US); Toshihiro Wakamatsu, West Bloomfield, MI (US)

(73) Assignee: DENSO International America, Inc., Soutfield, MI (US)

( * ) Notice: Subject to any disclaimer, the term of this patent is extended or adjusted under 35 U.S.C. 154(b) by 1232 days.

This patent is subject to a terminal disclaimer.

(21) Appl. No.: 11/680,755

(22) Filed: Mar. 1, 2007

(65) Prior Publication Data

US 2007/0200672 A1 Aug. 30, 2007

Related U.S. Application Data

(63) Continuation-in-part of application No. 11/362,585, filed on Feb. 24, 2006.

(51) Int. Cl.
*B60R 25/00* (2006.01)
*G06F 7/04* (2006.01)
*H04B 1/00* (2006.01)
*H04Q 9/00* (2006.01)
*H04Q 5/22* (2006.01)

(52) U.S. Cl. ...................................... 340/5.72; 340/10.1
(58) Field of Classification Search .................. 340/5.72, 340/7.32; 307/10.1
See application file for complete search history.

(56) References Cited

U.S. PATENT DOCUMENTS

| | | | |
|---|---|---|---|
| 5,552,759 A * | 9/1996 | Stoyka ..................... 340/426.33 |
| 5,669,704 A | 9/1997 | Pastrick |
| 6,538,559 B1 * | 3/2003 | Okada .......................... 340/5.72 |
| 6,670,883 B1 * | 12/2003 | Asakura et al. .............. 340/5.61 |
| 6,909,964 B2 * | 6/2005 | Armstrong et al. ........... 701/207 |
| 6,963,268 B2 * | 11/2005 | Brillon .......................... 340/5.72 |
| 7,017,817 B2 * | 3/2006 | Ito et al. .................... 235/462.42 |
| 2001/0054952 A1 * | 12/2001 | Desai et al. .................... 340/5.72 |
| 2003/0139179 A1 * | 7/2003 | Fuchs et al. ................... 455/426 |
| 2004/0075531 A1 * | 4/2004 | Ieda et al. ..................... 340/5.72 |
| 2005/0168322 A1 | 8/2005 | Appenrodt et al. |
| 2005/0258936 A1 * | 11/2005 | Ghabra et al. ............... 340/5.72 |
| 2005/0285717 A1 * | 12/2005 | Ieda et al. ..................... 340/5.72 |
| 2007/0018793 A1 * | 1/2007 | Stewart et al. ............... 340/10.3 |
| 2007/0018839 A1 * | 1/2007 | Nathan et al. ................. 340/667 |
| 2007/0018840 A1 * | 1/2007 | Nathan et al. ................. 340/667 |
| 2008/0290990 A1 * | 11/2008 | Schaffzin et al. ............ 340/5.64 |

* cited by examiner

*Primary Examiner* — Benjamin C Lee
*Assistant Examiner* — Cal Eustaquio
(74) *Attorney, Agent, or Firm* — Harness, Dickey & Pierce, PLC

(57) ABSTRACT

An apparatus for automatically initiating a plurality of vehicle functions is disclosed. The apparatus includes a mobile unit and a detection device operable to automatically detect whether the mobile unit is within a first zone. The detection device is further operable to automatically detect whether the mobile unit is within a second zone. The first zone and the second zone are outside the vehicle, and the first zone encompasses the second zone. The apparatus further includes a controller that is operable to initiate a first vehicle function when the detection device detects that the mobile unit is within the first zone. The controller is also operable to initiate a second vehicle function when the detection device detects that the mobile unit is within the second zone.

26 Claims, 6 Drawing Sheets

APPARATUS FOR AUTOMATICALLY INITIATING SEQUENCE OF VEHICLE FUNCTIONS

CROSS-REFERENCE TO RELATED APPLICATIONS

This application is a continuation-in-part of U.S. patent application Ser. No. 11/362,585 filed on Feb. 24, 2006. The disclosure of the above application is incorporated herein by reference.

FIELD

The present disclosure relates to an apparatus for initiating vehicle functions and, more particularly, relates to an apparatus for automatically initiating a sequence of vehicle functions.

BACKGROUND

Vehicular door unlocking devices permit unlocking of vehicle doors in a variety of ways. In traditional systems, a key is inserted into a locking mechanism mounted to the vehicle door, and the door is unlocked by manually turning the key. In more modern systems a user pushes buttons on a remote control to remotely unlock or lock the vehicle door. In other so-called "Smart Key" systems, a key fob automatically establishes wireless communication with the vehicle when the fob is within range of the vehicle. The vehicle door is subsequently changed from a locked state to an unlock-standby state, and the door can then be opened with the door handle.

In many of these systems, other vehicle functions are initiated when the vehicle doors are unlocked. For instance, the interior vehicle lights are illuminated, the exterior lamps are illuminated, the horn sounds, or other sounds are generated when the vehicle doors are unlocked. These "welcome" functions may help the vehicle owner distinguish the vehicle from others in a crowded parking lot, for instance. The "welcome" functions may also ward off nefarious individuals located near the vehicle.

One problem with these prior art systems is that the "welcome" functions occur at approximately the same time as the door unlocking event. For instance, in the "Smart Key" system described above, the door unlocking event and any "welcome" functions are initiated once the key fob is relatively close to the vehicle. As such, the "welcome" functions may not help the user distinguish the vehicle from others, and the "welcome" functions may not ward off undesirable persons near the vehicle. Accordingly, there remains a need for a system that automatically initiates the "welcome" functions independent of the unlocking event.

SUMMARY

An apparatus for automatically initiating a plurality of vehicle functions is disclosed. The apparatus includes a mobile unit and a detection device operable to automatically detect whether the mobile unit is within a first zone. The detection device is further operable to automatically detect whether the mobile unit is within a second zone. The first zone and the second zone are outside the vehicle, and the first zone encompasses the second zone. The apparatus further includes a controller that is operable to initiate a first vehicle function when the detection device detects that the mobile unit is within the first zone. The controller is also operable to initiate a second vehicle function when the detection device detects that the mobile unit is within the second zone.

In another aspect, the present disclosure relates to a method of initiating a plurality of vehicle functions. The method includes the step of detecting when a mobile unit is within a first zone outside the vehicle. The method also includes the step of detecting when the mobile unit is within a second zone outside the vehicle, wherein the first zone encompasses the second zone. The method further includes the step of causing a first vehicle function when the mobile unit is detected within the first zone. In addition, the method includes the step of causing a second vehicle function when the mobile unit is detected within the second zone.

In still another aspect, the present disclosure relates to an apparatus for automatically initiating a plurality of vehicle functions. The apparatus includes a mobile unit and a detection device operable to transmit a first interrogation signal within a first zone. The mobile unit transmits a first identification signal in response to the first interrogation signal when the mobile unit is disposed within the first zone. The detection device is further operable to automatically detect whether the mobile unit is within the first zone by matching the first identification to a first predetermined identifier. The detection device is operable to transmit a second interrogation signal within a second zone, wherein the mobile unit transmits a second identification signal in response to the second interrogation signal when the mobile unit is disposed within the second zone. The detection device is further operable to automatically detect whether the mobile unit is within the second zone by matching the second identification to a second predetermined identifier. The first zone and second zone are outside the vehicle, and the first zone encompasses the second zone. The apparatus also includes a controller operable to initiate a vehicle light to illuminate when the detection device detects that the mobile unit is within the first zone. The controller is further operable to initiate a vehicle closure to enter an unlock-standby state when the detection device detects that the mobile unit is within the second zone.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DRAWINGS

The present disclosure will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
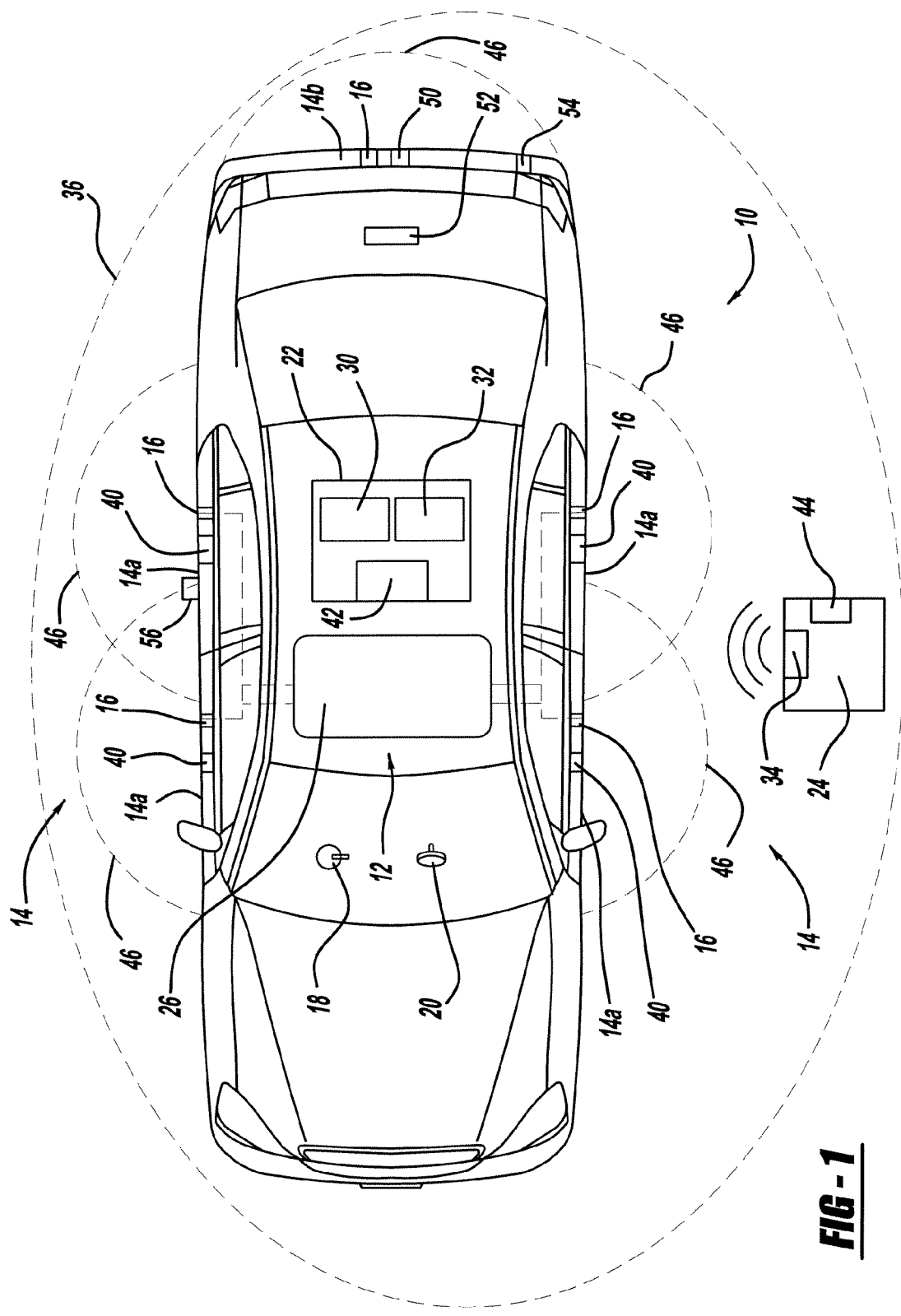
FIG. 1 is a top view of a vehicle equipped with a vehicle control apparatus.

Referring to FIG. 1, a vehicle 10 is illustrated that includes a vehicle control apparatus generally indicated at 12. As will be explained in greater detail below, the vehicle control apparatus 12 is useful for operating a plurality of vehicle functions in sequence.

In the embodiment shown, the vehicle 10 includes a plurality of closures 14. More specifically, the vehicle 10 includes a plurality of passenger compartment closures (i.e., vehicle doors) 14a and a trunk closure 14b. Those having ordinary skill in the art will appreciate that the vehicle control apparatus 12 could be employed in any suitable vehicle 10 having any suitable configuration of closures 14, such as hingeably attached doors, sliding doors, hatchbacks, gates, and the like. Each of the closures 14 includes a closure locking mechanism 16, which can be changed between a locked state, an unlock-standby state, and an unlocked state in a manner to be described below. The vehicle 10 also includes at least one light 18 and at least one speaker 20. The light 18 can be an interior light of the vehicle 10 and/or the light 18 can be an exterior light of the vehicle 10. The speaker 20 can be an interior speaker of the vehicle 10, the speaker 20 can be an exterior speaker of the vehicle 10 or the speaker 20 can be the horn of the vehicle 10.

The vehicle control apparatus 12 includes a detection device 22, a mobile unit 24, and a controller 26. The detection device 22 and the controller 26 are mounted to the vehicle 10, and the mobile unit 24 is portable. In one embodiment, the mobile unit 24 is small enough to be held by the user in a pocket, purse, or other article. As will be explained in greater detail below, the detection device 22 is operable to detect the position of the mobile unit 24. The controller 26 is operable to cause a plurality of vehicle functions in sequence depending on the position of the mobile unit 24 relative to the detection device 22. For instance, as the user approaches the vehicle 10 with the mobile unit 24, the detection device 22 eventually detects the mobile unit 24 approaching, and the controller 26 will, in turn, initiate a first vehicle function, such as illuminating the light 18 and/or cause the speaker 20 to create a sound to thereby "welcome" the user. The sound may be a horn, music, a pre-selected sound clip, etc. Then, as the detection device 22 detects that the mobile unit 24 is even closer to the vehicle 10, the controller 26 will initiate a second vehicle function, such as changing the closure 14 from a locked state to an unlock-standby state. It will be appreciated that the first vehicle function and the second vehicle functions could be of any suitable type without departing from the scope of the present disclosure. As such, the first vehicle function(s) (i.e., the "welcome" functions) are initiated independent of the second vehicle functions (e.g., the unlocking of the vehicle closures 14). Thus, the lights and/or sounds and/or music can help the user distinguish the vehicle 10 from others and/or ward off undesirable persons from the vehicle 10 while the user is still relatively far away from the vehicle 10, and yet the vehicle closures 14 will unlock when the user is relatively close to the vehicle for added security.

As shown in FIG. 1, the detection device 22 includes a first antenna 30 and a first receiver 32, each of which are mounted to the vehicle 10. The mobile unit 24 includes a first transponder 34. The first antenna 30 transmits a first interrogation signal outward from the vehicle 10 in a polling fashion. When the mobile unit 24 is within range and receives the first interrogation signal, the first transponder 34 responds by transmitting a first identification signal. The first identification signal is received by the first receiver 32. Then, the detection device 22 matches the first identification signal to a predetermined identifier, such as a code stored in computer memory. If the first identification signal matches the predetermined identifier, the detection device 22 has validated and identified that the mobile unit 24 is located within a certain range of the vehicle 10.

More specifically, as illustrated in FIG. 1, the detection device 22 is able to communicate with the mobile unit 24 within a first zone 36. In other words, when the mobile unit 24 is within the first zone 36, the first transponder 34 is able to receive the first interrogation signal from the first antenna 30, and the first receiver 32 is able to receive the first identification signal transmitted in response from the first transponder 34. Accordingly, the detection device 22 is able to determine whether the mobile unit 24 is located within the first zone 36 in the manner described above.

In one embodiment, the first interrogation signal and the first identification signal are radio frequency (RF) signals transmitted at approximately 315 MHz. Those having ordinary skill in the art will appreciate, however, that the first interrogation signal and the first identification signal could be of any suitable type and frequency without departing from the scope of the present disclosure.

The detection device 22 also includes a plurality of second antennae 40 and at least one second receiver 42. In the embodiment shown, each of the second antennae 40 is mounted adjacent one of the vehicle closures 14. The mobile unit 24 also includes a second transponder 44. Each of the second antennae 40 is operable to transmit a second interrogation signal outward from the vehicle 10. In one embodiment, the second antennae 40 transmits the second interrogation signal only after the detection device 22 detects that the mobile unit 24 is within the first zone 36 to conserve energy. When the mobile unit 24 is within range of one of the second antennae 40 and receives the second interrogation signal, the second transponder 44 responds by transmitting a second identification signal. The second receiver 42 receives the second identification signal, and the detection device 22 matches the second identification signal to a predetermined identifier to thereby validate the mobile unit 24 and to detect that the mobile unit 24 is within range of the second antenna 40. Furthermore, the controller 26 can be programmed to terminate transmission of the second interrogation signal if the user enters the first zone 36 but does not enter one of the second zones 46 within a predetermined time. Once transmission of the second interrogation signal has been terminated, the controller 26 can be programmed to restart the transmission of the second interrogation signal by the action of a user such as pulling a door handle, pushing a button on the mobile unit or by any other action by the user.

More specifically, as illustrated in FIG. 1, the detection device 22 is able to communicate with the mobile unit 24 when the mobile unit 24 is within a second zone 46. In other words, when the mobile unit 24 is within one of the second zones 46, the second transponder 44 is able to receive the second interrogation signal from the corresponding second antenna 40, and the second receiver 42 is able to receive the second identification signal transmitted in response from the second transponder 44. Accordingly, the detection device 22 is able to determine whether the mobile unit 24 is located within one of the second zones 46 in the manner described above.

In one embodiment, the second interrogation signal and the second identification signal are low frequency (LF) signals that are transmitted at approximately 125 kHz. As such, the LF signals are created via magnetic coupling, and the magnetic field is generated with a transmitter coil, usually together with a capacitor to generate a resonance circuit as is generally known. Those having ordinary skill in the art will appreciate, however, that the second interrogation signal and the second identification signal could be of any suitable type and frequency without departing from the scope of the present disclosure. For instance, the second interrogation signal and the second identification signal may be radio frequency (RF) signals, as in the first interrogation signal and the first identification signal. In such a configuration, all interrogation signals and all identification signals, regardless of zones, would utilize radio frequency (RF) signals. Furthermore, in the event that radio frequency signals are solely utilized, distances of the mobile unit 24 from the vehicle 10 may be measured by the strength of received signals, as is known in the art. For instance, the distance of the mobile unit 24 from the detection device 22, may be measured by the strength of any radio frequency signal received by the detection device 22 from the mobile unit 24.

In one embodiment, each of the second zones 46 has a radius of approximately three feet from the vehicle 10. The first zone 36 extends significantly further from the vehicle 10. As shown, the first zone 36 overlaps and entirely encompasses each of the second zones 46. Accordingly, as the user approaches the vehicle 10, the mobile unit 24 will be in communication with the first antenna 30 before the mobile unit 24 is in communication with the second antennae 40 and second receiver 42.

In one embodiment, the boundary of the first zone 36 is ultimately determined by the strength of the first interrogation signal and the first identification signal, and the mobile unit 24 effectively "enters the first zone 36" as soon as the first transponder 34 begins communicating with the detection device 22. Likewise, the boundary of the second zones 46 is ultimately determined by the strength of the second interrogation signal and the strength of the second identification signal, and the mobile unit 24 effectively "enters the second zone" as soon as the second transponder 44 begins communicating with the detection device 22. Again, each zone may utilize different signals, such as radio frequency (RF) signals for the first volley of communications when approaching the vehicle 10 and low frequency (LF) signals for the second volley of communications when closer to the vehicle 10, or radio frequency (RF) and distance measuring may be used for all communications.

In another embodiment, the detection device 22 includes programmed logic that determines the distance between the detection device 22 and the mobile unit 24 based on the strength of the first and/or second identification signal in a manner that is generally known in the art. As such, the boundary of the first zone 36 is predetermined, and the mobile unit 24 effectively "enters the first zone" as soon as the strength of the first identification signal indicates that the mobile unit 24 is within the boundary of the first zone 36. Likewise, the boundary of the second zone 46 is predetermined, and the mobile unit 24 effectively "enters the second zone" as soon as the strength of the second identification signal indicates that the mobile unit 24 is within the boundary of the second zone 46.

Thus, the detection device 22 can detect whether the mobile unit 24 is within the first zone 36 or the second zone 46. As the user enters the first zone 36 with the mobile unit 24, the controller 26 initiates a first vehicle function. The first vehicle function can be of any suitable type, such as illuminating the light 18, creating a sound with the speaker 20, turning on the vehicle's ignition, playing a pre-selected sound clip, playing music or otherwise. Accordingly, by initiating the first vehicle function, the vehicle 10 "welcomes" the user. This can be useful for distinguishing the user's vehicle from others in a crowded parking lot, for warding off undesirable people near the vehicle 10, or otherwise.

As the user further approaches the vehicle 10, and the mobile unit 24 coincidently enters one of the second zones 46, the controller 26 initiates a second vehicle function. In one embodiment, the second vehicle function occurs by changing the locking mechanism 16 from a locked state to an unlock-standby state. Each closure has a contact sensor, and once the locking mechanism 16 is in the unlock-standby state, the locking mechanism 16 unlocks when the contact sensor is contacted and the door handle is pulled. This second vehicle function is disclosed in commonly owned U.S. Patent Application Publication 2004/0119628, which is hereby incorporated herein by reference.

As shown in FIG. 1 and as mentioned above, the detection device 22 generates a plurality of second zones 46, and in this embodiment, when the mobile unit 24 moves into one of the second zones 46, only the locking mechanism 16 corresponding to that second zone 46 changes from the locked state to the unlock-standby state. Thus, if the user approaches the driver's side door, the mobile unit 24 will enter the second zone 46 adjacent the driver's side door, and the detection device 22 will detect that the mobile unit 24 has entered the second zone 46 adjacent the driver's side door. The controller 26 will cause the locking mechanism 16 of the driver's side door to change from a locked state to an unlock-standby state. Then, the locking mechanism 16 will unlock and the driver's side door can be opened by contacting and pulling on the door handle of the driver's side door as described in U.S. Patent Application Publication No. 2004/0119628, which is hereby incorporated by reference. The controller 26 can also be programmed to unlock just the door adjacent the second zone 46 in which the mobile unit 24 has entered or the controller 26 can be programmed to open any number of the vehicle closures 14 when the mobile unit 24 enters a specific second zone 46.

In one embodiment, the controller 26 automatically opens the vehicle closure 14 in a manner disclosed in co-owned U.S. patent application Ser. No. 11/301,076, filed Dec. 12, 2005, which is hereby incorporated by reference in its entirety. In this embodiment, the vehicle 10 includes a closure release solenoid 50 and an actuator 52. The solenoid 50 and the actuator 52 can be associated with any of the closures 14. The closure release solenoid 50 causes the locking mechanism 16 to release the corresponding closure 14 so that the closure 14 is capable of being opened after it is unlocked. Although a closure release solenoid 50 is described as the means of unlatching, any type of latching means could be employed, such as electric or magnetic latching. Once the closure 14 is unlatched, the actuator 52 releases stored energy from a biasing member or other energy storage device to cause the vehicle closure 14 to open automatically. As such, when the mobile unit 24 enters the second zone, the corresponding vehicle closure 14 automatically opens for the convenience of the user.

In one embodiment, the vehicle 10 includes an opener switch 54, and the controller 26 energizes the opener switch 54 when the mobile unit 24 enters one of the second zones 46. In one embodiment, the opener switch 54 is a laser emitter, such as that disclosed in co-owned U.S. patent application Ser. No. 11/301,076, filed Dec. 12, 2005, which is hereby incorporated by reference in its entirety. Once energized, the laser emitter emits a laser directed outside the vehicle. The user can break the laser beam by obstructing the path of the beam with a foot or other object, which causes the closure release solenoid 50 to release the corresponding closure 14 and allows the actuator 52 to open the vehicle closure 14. It will be appreciated that other opener switches 54 could be employed without departing from the scope of the present disclosure.

Moreover, in one embodiment, the vehicle 10 includes a vehicle ingress/egress device 56, such as a ramp, a step, or other similar device. The ingress/egress device 56 can be actuated toward and away from the vehicle. In the retracted position, the ingress/egress device 56 is disposed nearer the vehicle 10, and in an extended position, the ingress/egress device 56 is extended away from the vehicle 10 to aid a user in getting into or out of the vehicle 10. In this embodiment, the controller 26 actuates the ingress/egress device 56 from the retracted position to the extended position automatically when the mobile unit 24 enters one of the second zones 46.

Furthermore, in one embodiment, the controller 26 is further operable to automatically terminate the first vehicle function. For example, if the user enters the first zone 36 and the controller 26 causes the light 18 to illuminate, but then the user does not enter one of the second zones 46 within a predetermined time, the controller 26 automatically turns off the light 18. Accordingly, the controller 26 terminates the first vehicle function to thereby conserve energy.

One of the first vehicle functions that can be performed by controller 26 is the playing of a pre-selected music tone or a sound clip or other pre-recorded music. In order to allow for the pre-selected music tune or a sound clip or the like to be performed as the first vehicle function, the user would have to program the vehicle with the users selection. The recording of the selection by the user can be accomplished in a variety of ways including storing the recording in controller 26, storing the recording in a navigation system, storing the recording in the vehicle's sound system or storing the recording in any other ECU or similar device within the vehicle. The vehicle's manufacturer can also allow the downloading of a recording via a wireless network which is now available on some vehicles. Once the recording has been stored in a device in the vehicle, controller 26 can be programmed to play the recording as the first vehicle function.

Figure 2:
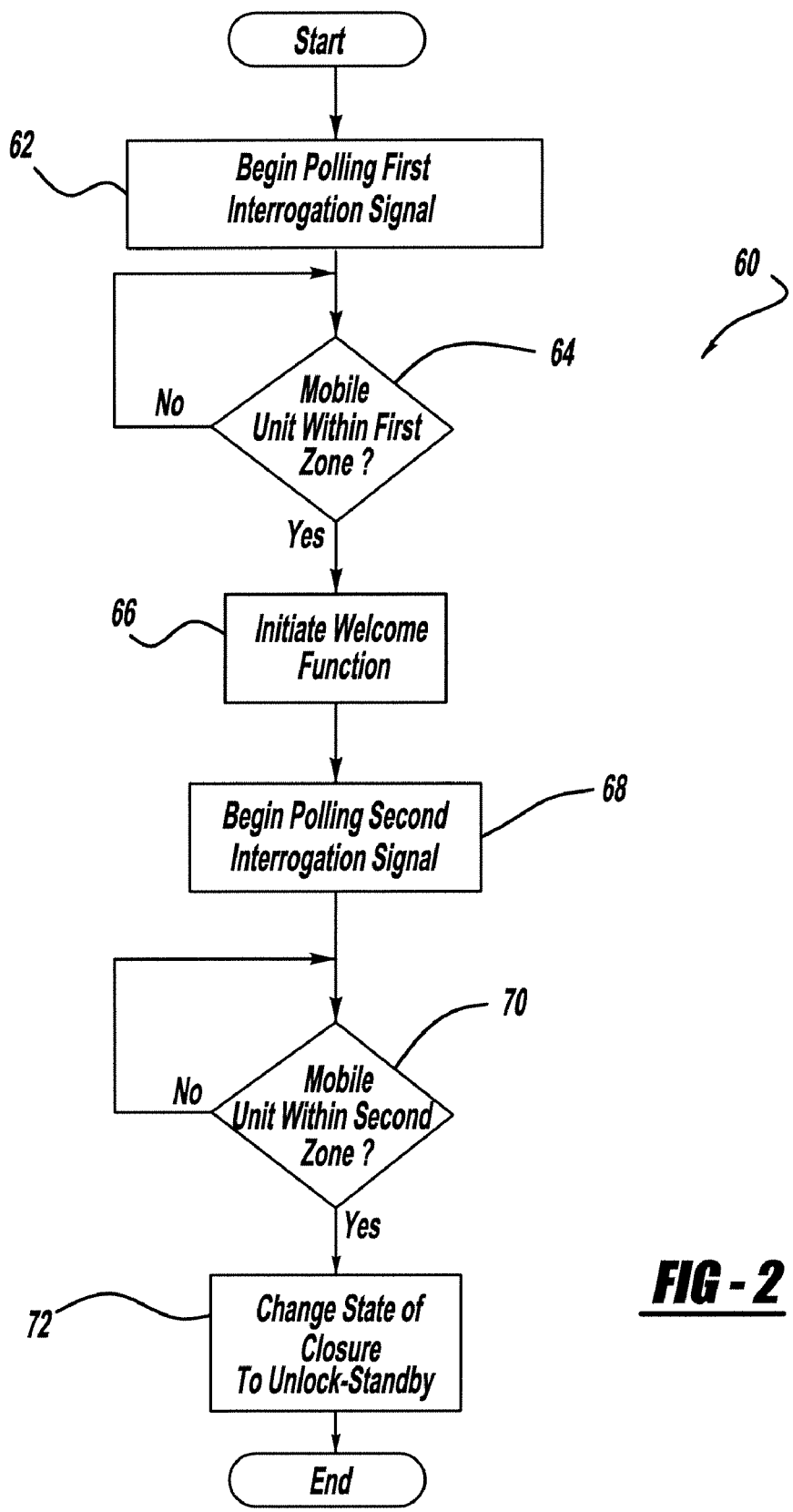
FIG. 2 is a flow chart illustrating a method of operating the vehicle control apparatus of FIG. 1.

Referring now to FIG. 2, a flow chart representing a method 60 of operating the vehicle control apparatus 12 is illustrated. The method 60 begins in step 62 in which the first antenna 30 of the detection device 22 begins transmitting the first interrogation signal in a polling fashion. Then, in step 64, it is determined whether the mobile unit 24 is detected within the first zone. If the mobile unit 24 is outside of the first zone 36, step 64 loops back upon itself. If the mobile unit 24 is detected within the first zone 36, the method 60 continues to step 66. In step 66, the first function (i.e., the "welcome" function) is initiated. As described above, step 66 could be completed by illuminating the light 18, creating a sound with the speaker 20, playing a recording, starting the ignition of the vehicle 10, or otherwise. Then, in step 68, the detection device 22 begins transmitting the second interrogation signal from the second antennae 40. Next, in decision block 70, it is determined whether the mobile unit 24 is within one of the second zones 46. If the mobile unit 24 is not detected within any of the second zones 46, decision block 70 loops back upon itself. If the mobile unit 24 is detected within one of the second zones 46, the method 60 continues to step 72. In step 72, the state of the vehicle closure 14 is changed from a locked state to an unlock-standby state.

While the operative workings of the above teachings have been described using separate sets of equipment, that is, a first antenna 30 and a first receiver 32 and a second antenna 40 and a second receiver 42, the teachings are not limited to such, and as a result, the first and second antenna 30, 40 may be a single antenna, while the first and second receiver 32, 42 may be a single receiver. In such a situation, the function and performance of the apparatus remains the same as described.

Figure 3:
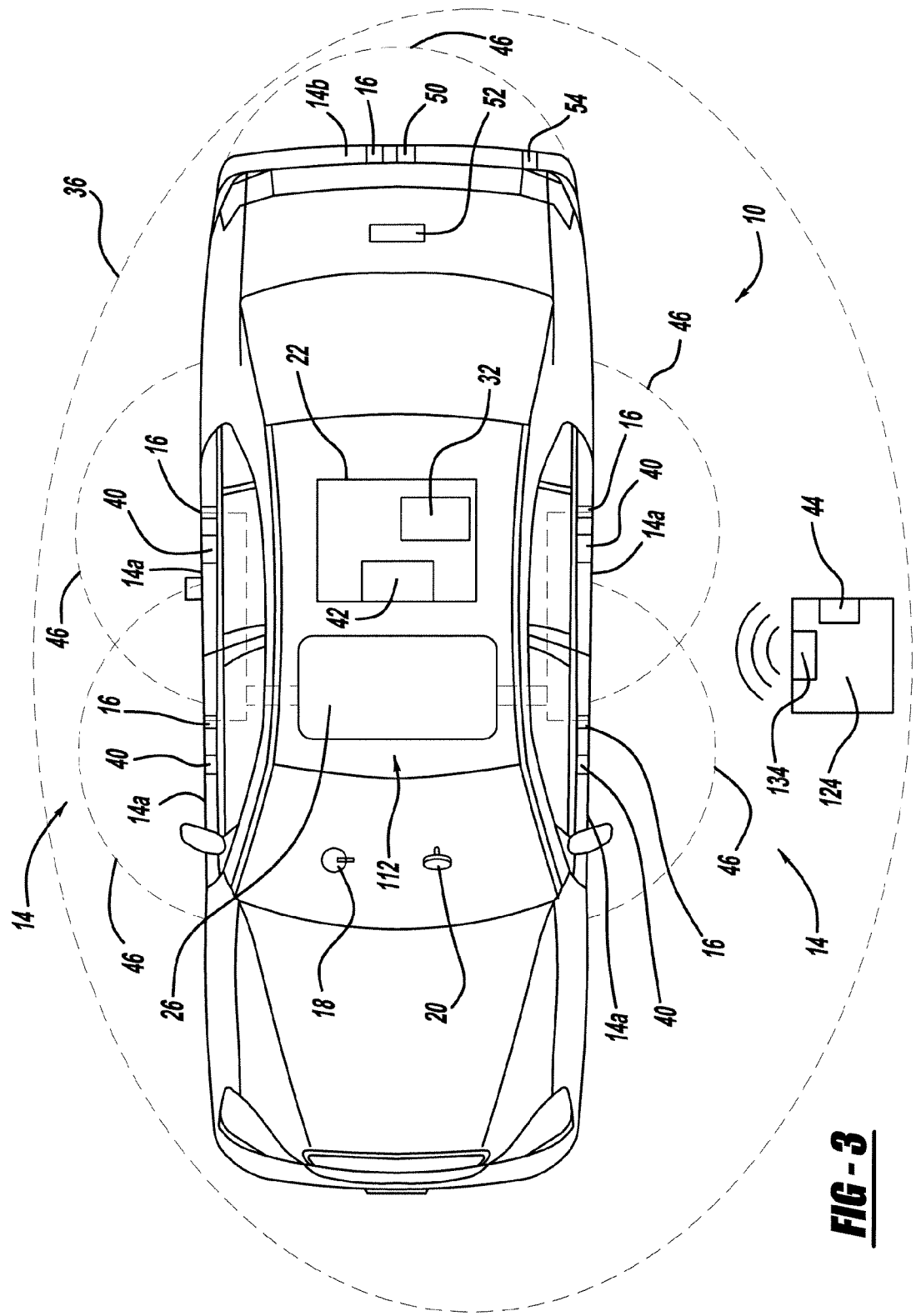
FIG. 3 is a top view of a vehicle equipped with a vehicle control apparatus according to another embodiment of the present disclosure.

Referring now to FIG. 3, a vehicle 110 is illustrated that includes a vehicle control apparatus 112 in accordance with another embodiment of the present invention. In the embodiment shown, the vehicle 110 includes a plurality of closures 14. More specifically, the vehicle 110 includes a plurality of passenger compartment closures (i.e., vehicle doors) 14a and a trunk closure 14b. Those having ordinary skill in the art will appreciate that the vehicle control apparatus 112 could be employed in any suitable vehicle 110 having any suitable configuration of closures 14, such as hingeably attached doors, sliding doors, hatchbacks, gates, and the like. Each of the closures 14 includes a closure locking mechanism 16, which can be changed between a locked state, an unlock-standby state, and an unlocked state in a manner to be described below. The vehicle 110 also includes at least one light 18 and at least one speaker 20. The light 18 can be an interior light of the vehicle 110 and/or the light 18 can be an exterior light of the vehicle 110. The speaker 20 can be an interior speaker of the vehicle 110, the speaker 20 can be an exterior speaker of the vehicle 110, or the speaker 20 can be the horn of the vehicle 110.

The vehicle control apparatus 112 includes a detection device 122, a mobile unit 124, and the controller 26. The detection device 122 and the controller 26 are mounted to the vehicle 110, and the mobile unit 124 is portable. In one embodiment, the mobile unit 124 is small enough to be held by the user in a pocket, purse, or other article. As will be explained in greater detail below, the detection device 122 is operable to detect the position of the mobile unit 124. The controller 26 is operable to cause a plurality of vehicle functions in sequence depending on the position of the mobile unit 124 relative to the detection device 122. For instance, as the user approaches the vehicle 110 with the mobile unit 124, the detection device 122 eventually detects the mobile unit 124 approaching, and the controller 26 will, in turn, initiate a first vehicle function, such as illuminating the light 18 and/or cause the speaker 20 to create a sound to thereby "welcome" the user. The sound may be a horn, music, a pre-selected sound clip, etc. Then, as the detection device 122 detects that the mobile unit 124 is even closer to the vehicle 110, the controller 26 will initiate a second vehicle function, such as changing the closure 14 from a locked state to an unlock-standby state. It will be appreciated that the first vehicle function and the second vehicle functions could be of any suitable type without departing from the scope of the present disclosure. As such, the first vehicle function(s) (i.e., the "welcome" functions) are initiated independent of the second vehicle functions (e.g., the unlocking of the vehicle closures 14). Thus, the lights and/or sounds can help the user distinguish the vehicle 110 from others and/or ward off undesirable persons from the vehicle 110 while the user is still relatively far away from the vehicle 110, and yet the vehicle closures 14 will unlock when the user is relatively close to the vehicle for added security.

As shown in FIG. 3, the detection device 122 includes a first receiver 32, which is mounted to the vehicle 110. The mobile unit 124 includes a first antenna 134. The first antenna 134 of the mobile unit 124 periodically sends a radio frequency (RF) signal which includes a first identification signal. When the mobile unit 124 is within range, the first receiver 32 of the detection device 122 receives the RF signal with the first identification signal from the mobile unit 124.

Upon receipt of the RF signal and verification of the first identification signal from the mobile unit 124, the controller 26 initiates the first vehicle function in the same manner as described above. The RF signal from the mobile unit 124 will be received when the mobile unit 124 enters first zone 36.

In addition, the detection device 122 also includes the plurality of second antennas 40 and the at least one second receiver 42. In addition, the mobile unit 124 also includes the transponder 44.

Similar to the embodiment described above, each of the second antennae 40 is operable to transmit a second interrogation signal outward from the vehicle 110. In one embodiment, the second antennae 40 transmits the second interrogation signal only after the detection device 122 detects that the mobile unit 124 is within the first zone 36 to conserve energy. When the mobile unit 124 is within range of one of the second antennae 40 and receives the second interrogation signal, the second transponder 44 responds by transmitting a second identification signal. The second receiver 42 receives the second identification signal, and the detection device 122 matches the second identification signal to a predetermined identifier to thereby validate the mobile unit 124 and to detect that the mobile unit 124 is within range of the second antenna 40.

The boundary of the first zone 36 is ultimately determined by the strength of the RF signal, typically at approximately 315 MHz, sent by the first antenna 134 of the mobile unit 124. The mobile unit 124 effectively "enters the first zone 36" as soon as the first receiver 32 begins communicating with the first antenna 134. Likewise, the boundary of the second zones 46 is ultimately determined by the strength of the interrogation signal from the corresponding second antenna 40 and the strength of the identification signal from the transponder 44. The mobile unit 124 effectively "enters the second zone 46" as soon as the responder 44 begins communicating with the detection device 122. The first zone 36, in this embodiment, utilizes radio frequency (RF) signals for the first zone 36 communication when approaching vehicle 110 and low frequency (LF) signals for the second zones 46 communication when closer to the vehicle 110. The first zone 36 can utilize high power LF communication and the second zone 46 can utilize RF communication. In addition, distance measuring may be used for all communication.

The operation and features for this embodiment are the same as the previous embodiment except for the communication in the first zone 36. In this embodiment, the mobile unit 124 periodically transmits a signal which is received by detection device 122 to initiate the first function. The operation and function of the second zone communication is the same as that described in the previous embodiment including all of the variations.

Figure 4:
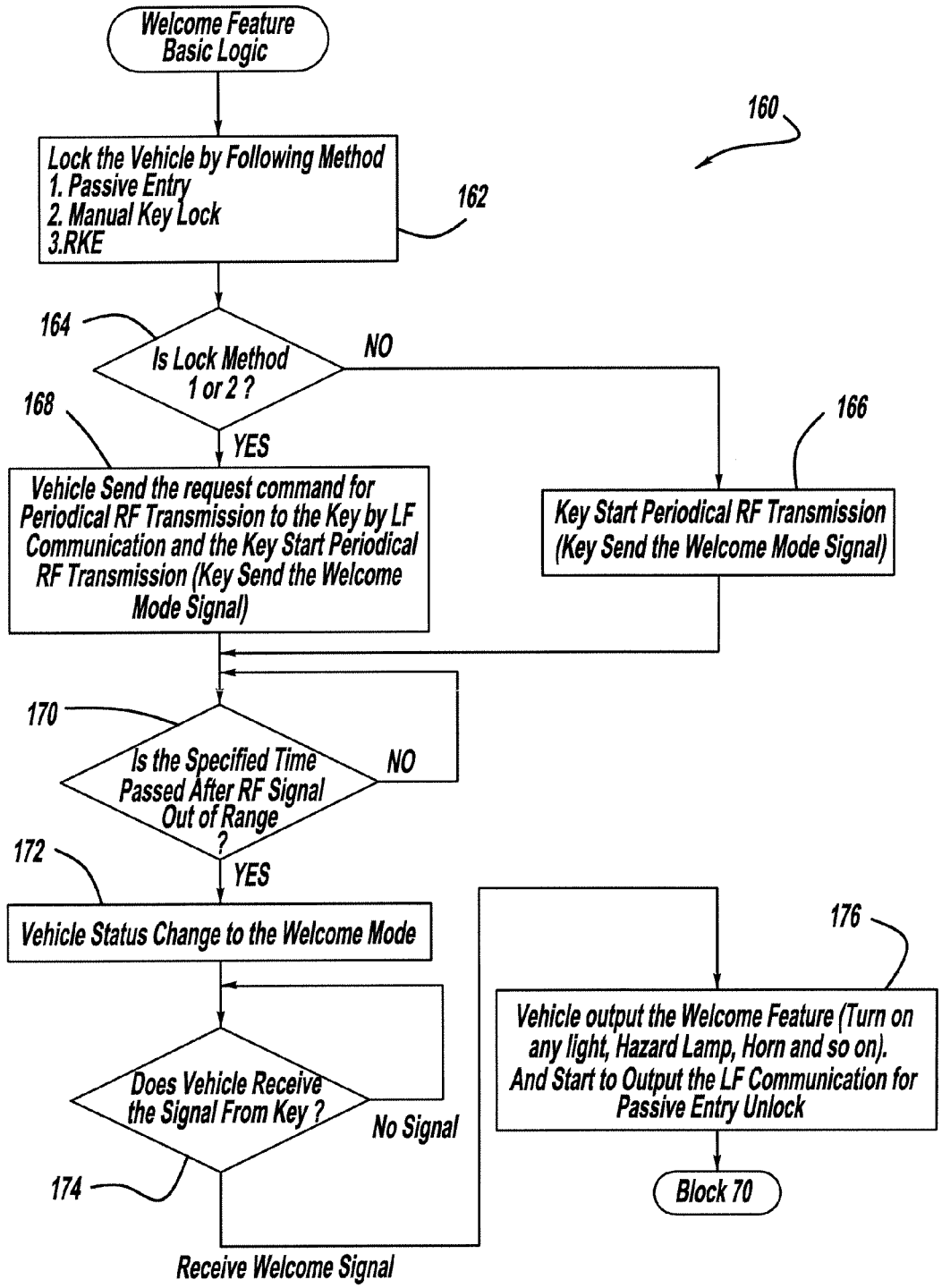
FIG. 4 is a flow chart illustrating a method of operating the vehicle control apparatus of FIG. 3.

Referring now to FIG. 4, a flow chart representing a method 160 of operating the control apparatus 112 is illustrated. The method 160 begins in block 162 in which the vehicle 110 is locked by the user. In block 164 it is determined if the vehicle was locked using passive entry or manually or if the vehicle was locked using remote key entry (RKE) from the mobile unit 124. If the vehicle was locked using RKE, the mobile unit 124 is instructed by the RKE to begin the periodical RF transmission at block 166. If the passive entry or manual locking of the vehicle was performed, the vehicle sends the command to initiate the periodic RF transmission using the LF communication system at block 168. At block 170, it is determined if the periodic transmission of the RF signal has been out of range for a specified period of time. If the periodic transmission of the RF signal continues to be received, decision block 170 loops back upon itself. Once the periodic transmission of the RF signal has not been received for a specified period of time, the method proceeds to block 172 where the vehicle 110 changes to the welcome mode. At block 174, the vehicle 110 continues to monitor to determine if a signal has been received from the mobile unit 124. If no signal has been received, decision block 174 loops back upon itself. Once a signal from the mobile unit 124 has been received, the method proceeds to block 176 where the first function (i.e. the "welcome" function) is initiated. As described above, block 176 could be completed by illuminating the light 18, creating a sound with the speaker 20, music, playing a pre-selected sound clip starting the ignition of the vehicle 110 or otherwise. Then, in block 176, the detection device 122 begins transmitting the second interrogation signal from the second antennae 40. Next, the method is transferred to block 70 illustrated in FIG. 2.

In the embodiment illustrated in FIGS. 3 and 4, the mobile unit 124 periodically sends a radio frequency (RF) signal to initiate the first vehicle function. The initiation of the sending of the radio frequency (RF) signal by the mobile unit 124 can be accomplished in different manners including but not limited to the following.

First, the mobile unit 124 can be programmed to always transmit the radio frequency (RF) signal.

Second, the vehicle can send a periodical RF output request command by using the LF communication system built into the vehicle. This output of the periodical RF output request can be done at a normal power level or at an increased power level.

Third, the mobile unit 124 can be designed to sense motion. Once motion has been detected by the mobile unit 124, the transmission of the periodic RF signal would begin. This would help to reduce the battery drain on the mobile unit 124. In addition, the mobile unit can be equipped with a motion charging unit that recharges a battery in the mobile unit due to the movement of the mobile unit.

Fourth, in any of the embodiments described in this disclosure, the mobile unit 124 can be equipped with a button or key which initiates the transmission of the periodic RF signal. In addition, the button or key can be the only way to initiate the transmission of the periodic RF signal.

Fifth, in any one of the embodiments described in this disclosure, the periodic transmission of the RF signal by the mobile unit can be stopped after a predetermined time if the mobile unit is recognized by the vehicle. In this case, the transmission of the RF signal could be restarted by an input by the user.

Figure 5:
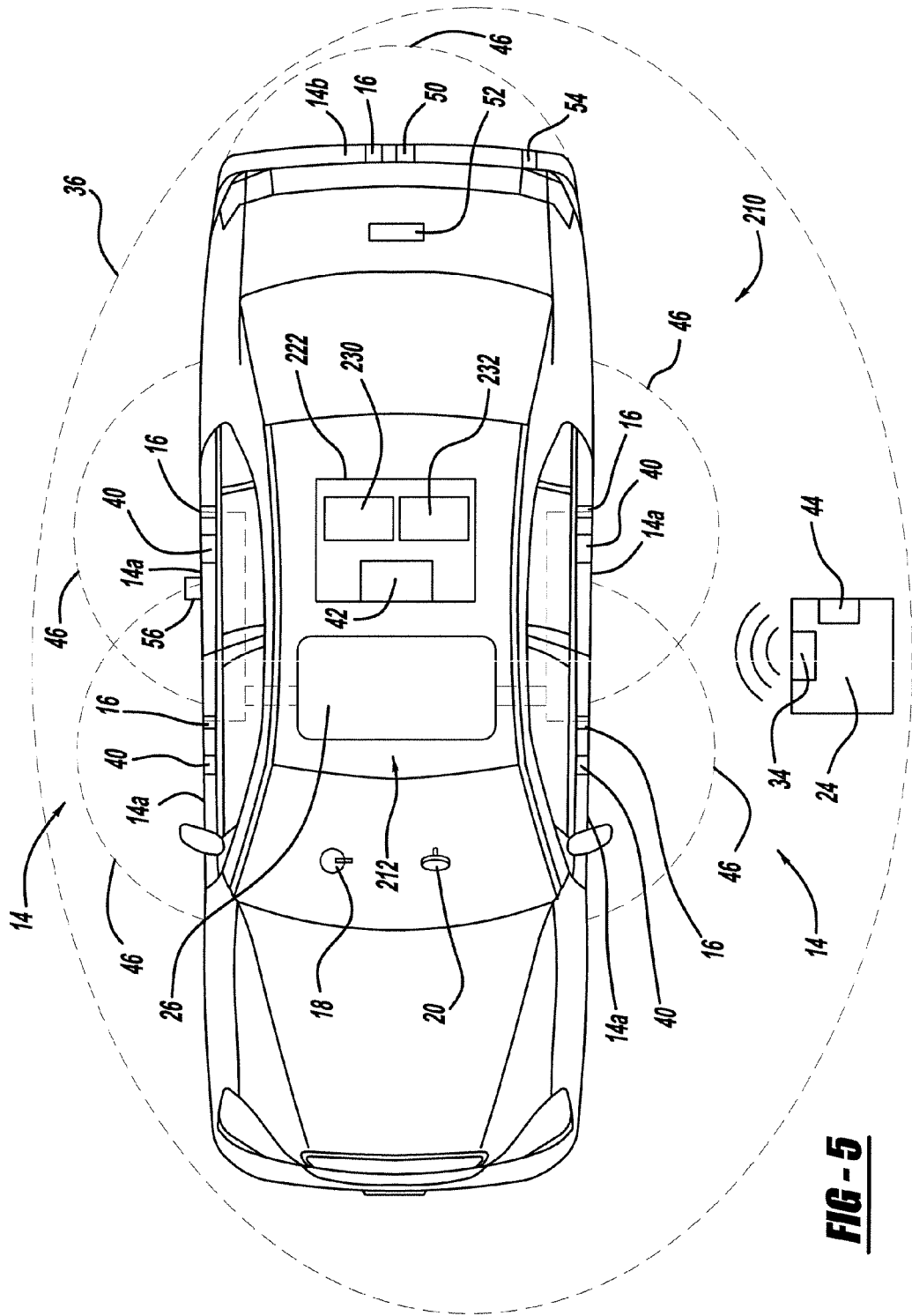
FIG. 5 is a top view of a vehicle equipped with a vehicle control apparatus according to another embodiment of the present disclosure.

Referring now to FIG. 5, a vehicle 210 is illustrated that includes a vehicle control apparatus 212 in accordance with another embodiment of the present invention. In the embodiment shown, the vehicle 210 includes a plurality of closures 14. More specifically, the vehicle 210 includes a plurality of passenger compartment closures (i.e., vehicle doors) 14a and a trunk closure 14b. Those having ordinary skill in the art will appreciate that the vehicle control apparatus 212 could be employed in any suitable vehicle 210 having any suitable configuration of closures 14, such as hingeably attached doors, sliding doors, hatchbacks, gates, and the like. Each of the closures 14 includes a closure locking mechanism 16, which can be changed between a locked state, an unlock-standby state, and an unlocked state in a manner to be described below. The vehicle 210 also includes at least one light 18 and at least one speaker 20. The light 18 can be an interior light of the vehicle 210 and/or the light 18 can be an exterior light of the vehicle 210. The speaker 20 can be an interior speaker of the vehicle 210, the speaker 20 can be an exterior speaker of the vehicle 210, or the speaker 20 can be the horn of the vehicle 210.

The vehicle control apparatus 212 includes a detection device 222, a mobile unit 224, and a controller 26. The detection device 222 and the controller 26 are mounted to the vehicle 210, and the mobile unit 224 is portable. In one embodiment, the mobile unit 224 is small enough to be held by the user in a pocket, purse, or other article. As will be explained in greater detail below, the detection device 222 is operable to detect the position of the mobile unit 224. The controller 26 is operable to cause a plurality of vehicle functions in sequence depending on the position of the mobile unit 224 relative to the detection device 222. For instance, as the user approaches the vehicle 210 with the mobile unit 224, the detection device 222 eventually detects the mobile unit 224 approaching, and the controller 26 will, in turn, initiate a first vehicle function, such as illuminating the light 18 and/or cause the speaker 20 to create a sound to thereby "welcome" the user. The sound may be a horn, music, a pre-selected sound clip, etc. Then, as the detection device 222 detects that the mobile unit 224 is even closer to the vehicle 210, the controller 26 will initiate a second vehicle function, such as changing the closure 14 from a locked state to an unlock-standby state. It will be appreciated that the first vehicle function and the second vehicle functions could be of any suitable type without departing from the scope of the present disclosure. As such, the first vehicle function(s) (i.e., the "welcome" functions) are initiated independent of the second vehicle functions (e.g., the unlocking of the vehicle closures 14). Thus, the lights and/or sounds and/or music can help the user distinguish the vehicle 210 from others and/or ward off undesirable persons from the vehicle 210 while the user is still relatively far away from the vehicle 210, and yet the vehicle closures 14 will unlock when the user is relatively close to the vehicle for added security.

As shown in FIG. 5, the detection device 222 includes a first antenna 230 and a first receiver 232 which is mounted to the vehicle 210. The mobile unit 224 includes a first transponder 234. The first antenna 230 transmits a high power low frequency (LF) signal outward from the vehicle 210 in a polling fashion. When the mobile unit 224 is within range and receives the high power low frequency (LF) signal, the first transponder 234 responds by transmitting a return LF signal including a first identification signal. Upon return of the LF signal including the first identification signal from the mobile unit 224 to the first receiver 232, the controller 26 after verification of the first identification signal initiates the first vehicle function in the same manner as described above. By using a high power LF signal, the mobile unit 224 will be detected when mobile unit 224 enters the first zone 36.

In addition, the detection device 222 also includes the plurality of second antennas 40. The mobile unit 124 also includes the transponder 44. While first antenna 230 is illustrated as being separate from the plurality of antennas 40, it is within the scope of the present invention to utilize the plurality of antennas 40 for transmission of the high power LF signal if desired. The high power LF signal is transmitted less periodically than the low power short range LF signal described below.

Similar to the embodiments described above, each of the second antennae 40 is operable to transmit a second interrogation signal outward from the vehicle 210. In one embodiment, the second antennae 40 transmits the second interrogation signal only after the detection device 222 detects that the mobile unit 224 is within the first zone 36 to conserve energy. When the mobile unit 224 is within range of one of the second antennae 40 and receives the second interrogation signal, the second transponder 44 responds by transmitting a second identification signal. The second receiver 42 receives the second identification signal, and the detection device 222 matches the second identification signal to a predetermined identifier to thereby validate the mobile unit 224 and to detect that the mobile unit 224 is within range of the second antenna 40. While first receiver 232 is illustrated as being separate from second receiver 42, it is within the scope of the present invention to utilize one receiver, 42 or 232.

The boundary of the first zone will be determined by the strength of the high power LF signal, typically at approximately 125 kHz, sent by the first antenna 230 and the signal sent by the first transponder 234 of the mobile unit 224. The mobile unit 224 effectively "enters the first zone 36" as soon as the first receiver 232 begins communication with the first transponder 234. Likewise, the boundary of the second zones 46 is ultimately determined by the strength of the interrogation signal from the corresponding second antenna 40 and the strength of the identification signal from the second transponder 44. The mobile unit 224 effectively "enters the second zones 46" as soon as the second transponder 44 begins communicating with the detection device 222. Distance measuring may be used for all communication.

The operation and features for this embodiment are the same as the previous embodiment except for the communication in the first zone 36. In this embodiment only low frequency LF signals are used. A high power LF signal is periodically transmitted by first antenna 230. When mobile unit 224 enters the first zone 36 and receives the LF signal from first antenna 230, mobile unit 224 responds by sending a LF return signal using first transponder 234. The LF return signal from first transponder 234 is received by first receiver 232 and control apparatus 212 initiates the first function. The operation and function of the second zone communication is the same as that described in the previous embodiment including all of the variations.

Figure 6:
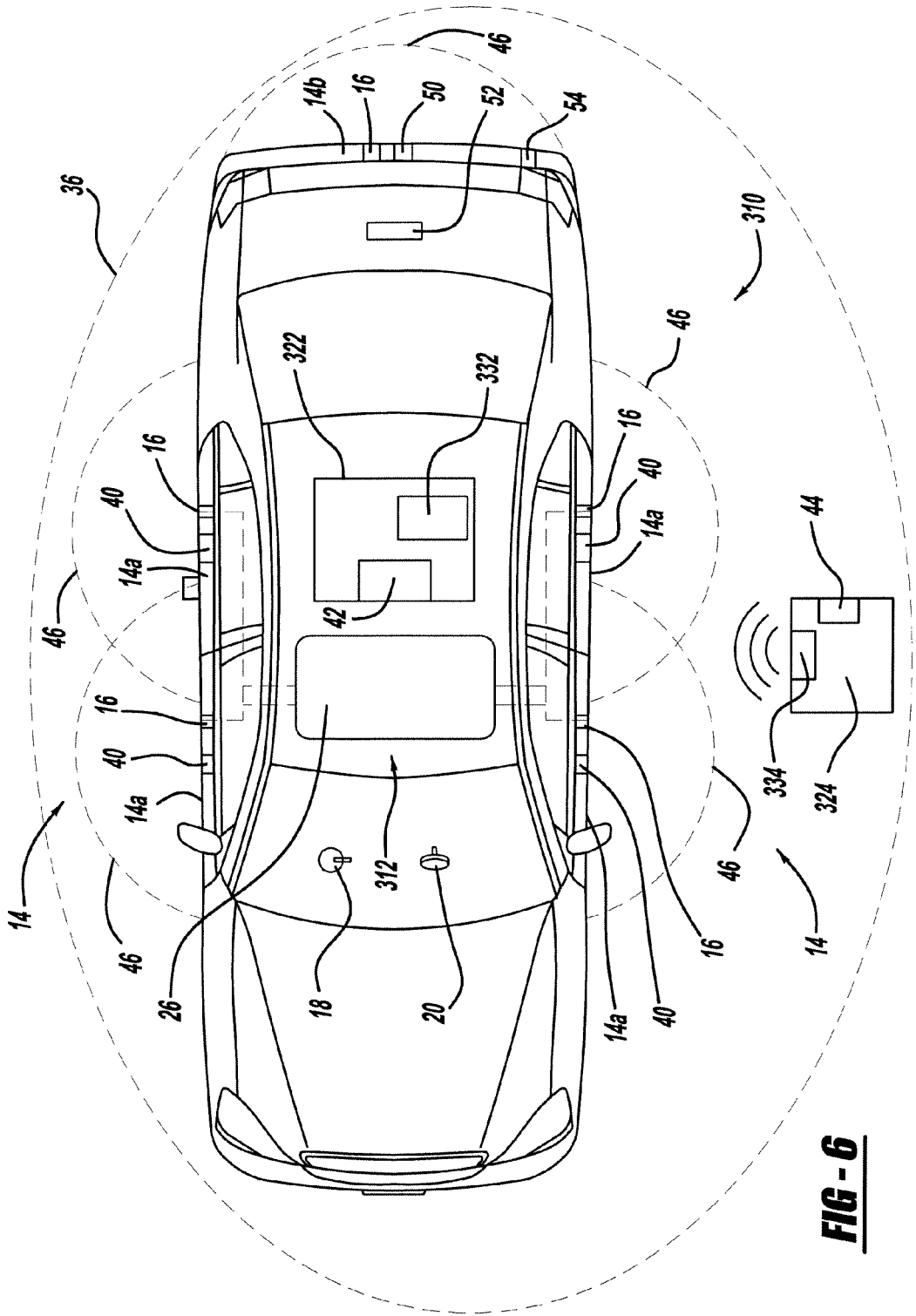
FIG. 6 is a top view of a vehicle equipped with a vehicle control apparatus according to another embodiment of the present disclosure.

Referring now to FIG. 6, a vehicle 310 is illustrated that includes a vehicle control apparatus 312 in accordance with another embodiment of the present invention. In the embodiment shown, the vehicle 310 includes a plurality of closures 14. More specifically, the vehicle 310 includes a plurality of passenger compartment closures (i.e., vehicle doors) 14a and a trunk closure 14b. Those having ordinary skill in the art will appreciate that the vehicle control apparatus 312 could be employed in any suitable vehicle 310 having any suitable configuration of closures 14, such as hingeably attached doors, sliding doors, hatchbacks, gates, and the like. Each of the closures 14 includes a closure locking mechanism 16, which can be changed between a locked state, an unlock-standby state, and an unlocked state in a manner to be described below. The vehicle 310 also includes at least one light 18 and at least one speaker 20. The light 18 can be an interior light of the vehicle 310 and/or the light 18 can be an exterior light of the vehicle 310. The speaker 20 can be an interior speaker of the vehicle 310, the speaker 20 can be an exterior speaker of the vehicle 310, or the speaker 20 can be the horn of the vehicle 310.

The vehicle control apparatus 312 includes a detection device 322, a mobile unit 324, and a controller 26. The detection device 322 and the controller 26 are mounted to the vehicle 310, and the mobile unit 324 is portable. In one embodiment, the mobile unit 324 is small enough to be held by the user in a pocket, purse, or other article. As will be explained in greater detail below, the detection device 322 is operable to detect the position of the mobile unit 324. The controller 26 is operable to cause a plurality of vehicle functions in sequence depending on the position of the mobile unit 324 relative to the detection device 322. For instance, as the user approaches the vehicle 310 with the mobile unit 324, the detection device 322 eventually detects the mobile unit 324 approaching, and the controller 26 will, in turn, initiate a first vehicle function, such as illuminating the light 18 and/or cause the speaker 20 to create a sound to thereby "welcome" the user. The sound may be a horn, music, a pre-selected sound clip, etc. Then, as the detection device 322 detects that the mobile unit 324 is even closer to the vehicle 310, the controller 26 will initiate a second vehicle function, such as changing the closure 14 from a locked state to an unlock-standby state. It will be appreciated that the first vehicle function and the second vehicle functions could be of any suitable type without departing from the scope of the present disclosure. As such, the first vehicle function(s) (i.e., the "welcome" functions) are initiated independent of the second vehicle functions (e.g., the unlocking of the vehicle closures 14). Thus, the lights and/or sounds and/or music can help the user distinguish the vehicle 310 from others and/or ward off undesirable persons from the vehicle 310 while the user is still relatively far away from the vehicle 310, and yet the vehicle closures 14 will unlock when the user is relatively close to the vehicle for added security.

As shown in FIG. 6, the detection device 322 includes a first receiver 332, which is mounted to the vehicle 310. The mobile unit 324 includes a first antenna 334. Upon exiting the vehicle, the position of the vehicle can be determined by using a Global Positioning System (GPS). Once the GPS data is known, it can be transmitted to mobile unit 324. The GPS data can be obtained by a cell phone, by a circuit built into the mobile unit 324, by a vehicle's navigation system or by any other means known in the art. Communication between the cell phone and the mobile unit 324 could be a wireless system such as Bluetooth. In a similar manner, communication between the cell phone and the vehicle 310 could be a wireless system such as Bluetooth. Communication between the vehicle 310 and the mobile unit 324 can be through the low frequency (LF) system described for the previous embodiments and described below. The exiting of the vehicle can be determined by seat sensors, locking of the doors or by any other means known in the art. Once the exiting of the vehicle has been determined, the GPS position of the vehicle is stored in the mobile unit 324.

After exiting of the vehicle has been determined, and after the mobile unit 324 has left the first zone 36 as detailed above, the GPS data for mobile unit 324 would periodically be sent to the mobile unit 324 to determine if the user is entering first zone 36. The updating of the GPS for the mobile unit 324 can be done using the cell phone and a wireless connection such as Bluetooth or the mobile unit 324 can include GPS circuitry. When the GPS location of the mobile unit 324 is determined to enter first zone 36. The mobile unit sends a radio frequency using RF or LF which includes a first identification signal using the first antenna 334. The first receiver 332 of the detection device 322 receives the RF or LF signal with the first identification signal from the mobile unit 324. The controller 26 initiates the first vehicle function after verification of the first identification signal in the same manner as described above. The controller 26 can be programmed to initiate a specific first vehicle function based on the location of the vehicle. For example, the controller 26 can be programmed to turn on lights and music if the location of the vehicle is at the home of the user and it can be programmed to only turn on the lights if the location of the vehicle is at the workplace of the user.

In addition, the detection device 322 also includes the plurality of second antennas 40 and at least one second receiver 42. In addition, the mobile unit 324 also includes the transponder 44.

Similar to the embodiment described above, each of the second antennae 40 is operable to transmit a second interrogation signal outward from the vehicle 310. In one embodiment, the second antennae 40 transmits the second interrogation signal only after the detection device 322 detects that the mobile unit 324 is within the first zone 36 to conserve energy. When the mobile unit 324 is within range of one of the second antennae 40 and receives the second interrogation signal, the second transponder 44 responds by transmitting a second identification signal. The second receiver 42 receives the second identification signal, and the detection device 322 matches the second identification signal to a predetermined identifier to thereby validate the mobile unit 324 and to detect that the mobile unit 324 is within range of the second antenna 40. While the first receiver 332 is illustrated as being separate from the second receiver 42, it is within the scope of the present invention to utilize one receiver, 42 or 332, if the same radio frequency is used for the first zone 36 and the second zone 46.

The boundary of the first zone 36 is ultimately determined by programming a specified distance into detection device 322. The mobile unit 324 effectively "enters the first zone 36" when the distance between the vehicle's 310 GPS position and mobile unit's 324 GPS position is less than the specified distance. The boundary of the second zones 46 is ultimately determined by the strength of the interrogation signal from the corresponding antenna 40 and the strength of the identification signal from the transponder 44. The mobile unit 324 effectively "enters the second zone 46" as soon as the transponder 44 begins communication with the detection device 322.

The operation and features for this embodiment are the same as the above embodiments except for the communication in the first zone 36. In this embodiment, the position of the mobile unit 324 in relation to the position of the vehicle 310 is accomplished using a GPS position comparison. The operation and function of the second zone communication is the same as described above in the previous embodiments including all of the variations.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for automatically initiating a plurality of vehicle functions, the apparatus comprising:
    a mobile unit;
    first means for detecting whether the mobile unit is within a first zone;
    a controller disposed within the vehicle, the controller initiating a first vehicle function when the first detecting means detects the mobile unit within the first zone;
    second means for detecting whether the mobile unit is within a second zone after the first detecting means detects whether the mobile unit is within the first zone, the first and second zones being outside a vehicle, the first zone encompassing the second zone, the first and second detecting means being disposed within the vehicle;
    the controller initiating a second vehicle function when the second detecting means detects the mobile unit in the second zone; wherein the controller terminates the first vehicle function if the detecting means does not detect the mobile unit within the second zone within a specified period of time.

2. The apparatus of claim 1, wherein the first detecting means is operable to transmit a first interrogation signal within the first zone, wherein the mobile unit is operable to transmit a first identification signal in response to the first interrogation signal, and wherein the first detecting means is operable to detect whether the mobile unit is within the first zone by matching the first identification signal to a first predetermined identifier.

3. The apparatus of claim 2, wherein the second detecting means is further operable to transmit a second interrogation signal within the second zone, wherein the mobile unit is operable to transmit a second identification signal in response to the second interrogation signal, and wherein the second detecting means is operable to detect whether the mobile unit is within the second zone by matching the second identification signal to a second predetermined identifier.

4. The apparatus of claim 3, wherein the first interrogation signal and the first identification signal are each radio frequency (RF) signals, and wherein the second interrogation signal and second identification signal are each low frequency (LF) signals.

5. The apparatus of claim 3, wherein the second detecting means transmits the second interrogation signal only after the first detecting means detects that the mobile unit is within the first zone.

6. The apparatus of claim 5, wherein the second detecting means ceases transmitting of the second interrogation when the second detecting means does not receive the second identification signal within a specified period of time.

7. The apparatus of claim 6, wherein the second detecting means restarts transmitting of the second interrogation signal in response to an input by a user.

8. The apparatus of claim 1, wherein the first vehicle function comprises playing a recording stored by the vehicle.

9. The apparatus of claim 8, wherein the recording is stored in a device in the vehicle.

10. The apparatus according to claim 9, wherein the apparatus further comprises means for wirelessly downloading the recording to the device.

11. The apparatus of claim 1, wherein the mobile unit includes a radio transmitter and the second detecting means includes a radio receiver, the radio transmitter periodically transmitting a signal which is received by the radio receiver when the mobile unit is within the first zone.

12. The apparatus of claim 11, wherein the first vehicle function comprises playing a recording stored by the vehicle.

13. The apparatus of claim 11, wherein the mobile unit includes a motion sensor, the radio transmitter periodically transmitting the signal when the motion sensor detects motion of the mobile unit.

14. The apparatus of claim 13, wherein the mobile unit includes a motion charging unit.

15. The apparatus of claim 13, wherein the first vehicle function comprises playing a recording stored by the vehicle.

16. The apparatus of claim 11, wherein the mobile unit ceases transmission of the signal when the mobile unit is not detected within the first zone within a specified period of time.

17. The apparatus of claim 11, wherein the radio transmitter transmits a radio frequency (RF) signal.

18. The apparatus of claim 17, wherein the radio transmitter begins transmitting the RF signal after receiving a low frequency (LF) signal from the vehicle.

19. The apparatus of claim 17, wherein the radio transmitter begins transmitting the RF signal in response to an input to the mobile unit by a user.

20. The apparatus of claim 1, wherein the first detecting means includes a radio transmitter, the first radio transmitter transmitting at a first power level to detect whether the mobile unit is within the first zone, the second detecting means includes a second radio transmitter, the second radio transmitter transmitting at a second power level to detect whether the mobile unit is within the second zone, the first power level being higher than the second power level.

21. The apparatus of claim 20, wherein the first vehicle function comprises playing a recording stored by the vehicle.

22. The apparatus of claim 1, wherein the mobile unit includes GPS data for a location of the vehicle and GPS data for a location of the mobile unit, the first detecting means detecting whether the mobile unit is within the first zone based on a distance between the location of the vehicle and the location of the mobile unit.

23. The apparatus of claim 22, wherein the first vehicle function comprises playing a recording stored by the vehicle.

24. The apparatus of claim 22, wherein the first vehicle function is associated with a specific location of the vehicle.

25. The apparatus of claim 1 further comprising:
third means for detecting a user action after said second detecting means detects whether the mobile unit is within the second zone;
the third means responding to the detecting of the user action, the responding including unlocking a door.

26. The apparatus of claim 25, wherein the second vehicle function comprises changing the door to an unlock-standby state.

* * * * *